(12) United States Patent
Wojciechowski et al.

(10) Patent No.: US 9,938,596 B2
(45) Date of Patent: Apr. 10, 2018

(54) TURBINE INDUCTION TEMPER SYSTEM

(75) Inventors: Marek Wojciechowski, Warsaw (PL); John Francis Nolan, Cobleskill, NY (US); John Matthew Sassatelli, Valley Falls, NY (US)

(73) Assignee: General Electric Company, Schenectady, NY (US)

( * ) Notice: Subject to any disclaimer, the term of this patent is extended or adjusted under 35 U.S.C. 154(b) by 971 days.

(21) Appl. No.: 13/454,859

(22) Filed: Apr. 24, 2012

(65) Prior Publication Data

US 2013/0193134 A1    Aug. 1, 2013

(30) Foreign Application Priority Data

Jan. 30, 2012    (PL) .......................................... 397937

(51) Int. Cl.
| | | |
|---|---|---|
| H05B 6/10 | (2006.01) | |
| C21D 1/42 | (2006.01) | |
| C21D 9/00 | (2006.01) | |
| C21D 1/10 | (2006.01) | |
| H05B 6/06 | (2006.01) | |
| F01D 5/00 | (2006.01) | |

(52) U.S. Cl.
CPC ................ C21D 1/42 (2013.01); C21D 1/10 (2013.01); C21D 9/0068 (2013.01); F01D 5/005 (2013.01); H05B 6/06 (2013.01); H05B 6/103 (2013.01); F05D 2230/40 (2013.01); F05D 2270/303 (2013.01); Y02P 10/253 (2015.11)

(58) Field of Classification Search
CPC ..... B05D 3/0272; B23P 25/003; H05B 6/129; H05B 6/6488; H05B 6/1263; H05B 6/105; H05B 6/06; B23K 1/002; B23K 13/02

USPC ....... 219/600, 601, 605, 607, 608, 623, 635, 219/665, 667
See application file for complete search history.

(56) References Cited

U.S. PATENT DOCUMENTS

| | | | |
|---|---|---|---|
| 3,596,037 A | | 7/1971 | Seulln et al. |
| 4,119,825 A | * | 10/1978 | Taylor et al. ................. 219/659 |
| 4,437,213 A | | 3/1984 | Reese et al. |
| 4,762,261 A | | 8/1988 | Hawly et al. |
| (Continued) | | | |

FOREIGN PATENT DOCUMENTS

| | | |
|---|---|---|
| EP | 0106421 A1 | 4/1984 |
| EP | 0934795 A2 | 8/1999 |
| (Continued) | | |

OTHER PUBLICATIONS

Search Report and Written Opinion from PL Application No. P-397937 dated Feb. 17, 2012.
(Continued)

Primary Examiner — Dana Ross
Assistant Examiner — Kuangyue Chen
(74) Attorney, Agent, or Firm — Ernest G. Cusick; Hoffman Warnick LLC

(57) ABSTRACT

A turbine induction temper system. In one embodiment, an induction temper system for a turbine includes: an induction member; a control system operably connected to the induction coil; and a temperature sensor operably connected with the control system, wherein the control system is configured to control an electrical current supplied induction member in response to a temperature indicator about a component of the turbine obtained from the temperature sensor.

20 Claims, 4 Drawing Sheets

(56) References Cited

U.S. PATENT DOCUMENTS

| | | | |
|---|---|---|---|
| 5,055,648 A * | 10/1991 | Iceland et al. | 219/601 |
| 5,060,375 A | 10/1991 | Demichel | |
| 5,736,714 A * | 4/1998 | Bechtold, Jr. | 219/521 |
| 6,166,359 A * | 12/2000 | Cruickshank | 219/607 |
| 6,555,801 B1 * | 4/2003 | LeMieux et al. | 219/656 |
| 6,606,892 B2 | 8/2003 | Fischer et al. | |
| 6,689,995 B2 * | 2/2004 | Eberhardt et al. | 219/635 |
| 6,811,375 B2 * | 11/2004 | Brisson et al. | 415/173.7 |
| 7,389,662 B2 | 6/2008 | Roberts et al. | |
| 7,491,916 B1 * | 2/2009 | Barber et al. | 219/616 |
| 7,641,739 B2 * | 1/2010 | Matlack et al. | 134/6 |
| 7,684,716 B2 * | 3/2010 | Ushiro | 399/33 |
| 7,966,856 B1 | 6/2011 | Razi et al. | |
| 2001/0004983 A1 * | 6/2001 | Wiezbowski | 219/667 |
| 2010/0037459 A1 | 2/2010 | Gaul | |
| 2012/0125919 A1 * | 5/2012 | Tanaka et al. | 219/635 |

FOREIGN PATENT DOCUMENTS

| | | |
|---|---|---|
| EP | 0934798 A2 | 8/1999 |
| EP | 2267278 A2 | 12/2010 |
| GB | 1333354 A | 10/1973 |
| GB | 2456628 A | 7/2009 |
| JP | 2004027261 A | 1/2004 |
| PL | 146997 B1 | 1/1987 |

OTHER PUBLICATIONS

European Patent Office, European Search Report for EP13153268 dated May 27, 2013, 2 pages.

Polservice Patent and Trademark Attorneys Office, Office Action for Polish Application No. P-397937, dated Feb. 10, 2015, 3 pages.

* cited by examiner

TURBINE INDUCTION TEMPER SYSTEM

BACKGROUND OF THE INVENTION

The subject matter disclosed herein relates to a temper system for a turbine. Specifically, the subject matter disclosed herein relates to a portable induction-based temper system for components of a turbine, such as a steam turbine.

Conventionally, some maintenance of turbine components (e.g., turbine nozzle partitions) involves transport of the components to a maintenance facility. At the maintenance facility, maintenance of static turbine diaphragm nozzle partitions can fall into two categories: minor and major. Minor repairs of static turbine nozzle partitions are conventionally performed using a metal filler applied via a welding process. These minor repairs are typically not stress-relieved after applying the filler, which allows these processes to sometimes be implemented in the field (at a customer site). Major repairs, in contrast, can require stress relief of the diaphragm (including the nozzle partition partitions) through heating in a furnace or an oven. In the case of major repairs, the turbine diaphragm are conventionally transported to and from the maintenance facility for repair. Additionally, major repairs are conventionally performed with the turbine nozzle partitions still disassembled from their associated auxiliary hardware. This requires that the auxiliary hardware (e.g., bolts, supports, keys, sealing strips, etc.) be separated from the nozzle partitions prior to oven tempering. Transport of the turbine, and disassembly of components can be both costly and time consuming.

BRIEF DESCRIPTION OF THE INVENTION

An induction temper system is disclosed. In one embodiment, an induction temper system for a turbine is disclosed including: an induction member; a control system operably connected to the induction member; and a temperature sensor operably connected with the control system, wherein the control system is configured to control an electrical current supplied to the induction member in response to a temperature indicator about a component of the turbine obtained from the infrared temperature sensor.

A first aspect of the invention includes an induction temper system for a turbine, the system having: an induction member; a control system operably connected to the induction member; and a temperature sensor operably connected with the control system, wherein the control system is configured to control an electrical current supplied to the induction member in response to a temperature indicator about a component of the turbine obtained from the temperature sensor.

A second aspect of the invention includes an induction temper system for a turbine, the system having: an induction member; a control system operably connected to the induction member; a temperature sensor operably connected with the control system; and a base member substantially supporting at least one of the control system, the induction member or the temperature sensor, wherein the control system is configured to control an electrical current supplied to the induction member in response to a temperature indicator about a component of the turbine obtained from the temperature sensor.

A third aspect of the invention includes an induction temper system for a turbine nozzle partition, the system comprising: an induction coil; a control system operably connected to the induction coil; a temperature sensor operably connected with the control system; and a base member substantially supporting at least one of the control system, the induction member or the temperature sensor, wherein the control system is configured to control an electrical current supplied to the induction coil in response to a temperature indicator obtained from the temperature sensor, and wherein the induction coil is configured to perform a localized heating of the steam turbine nozzle partition across a radial length of the nozzle partition.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
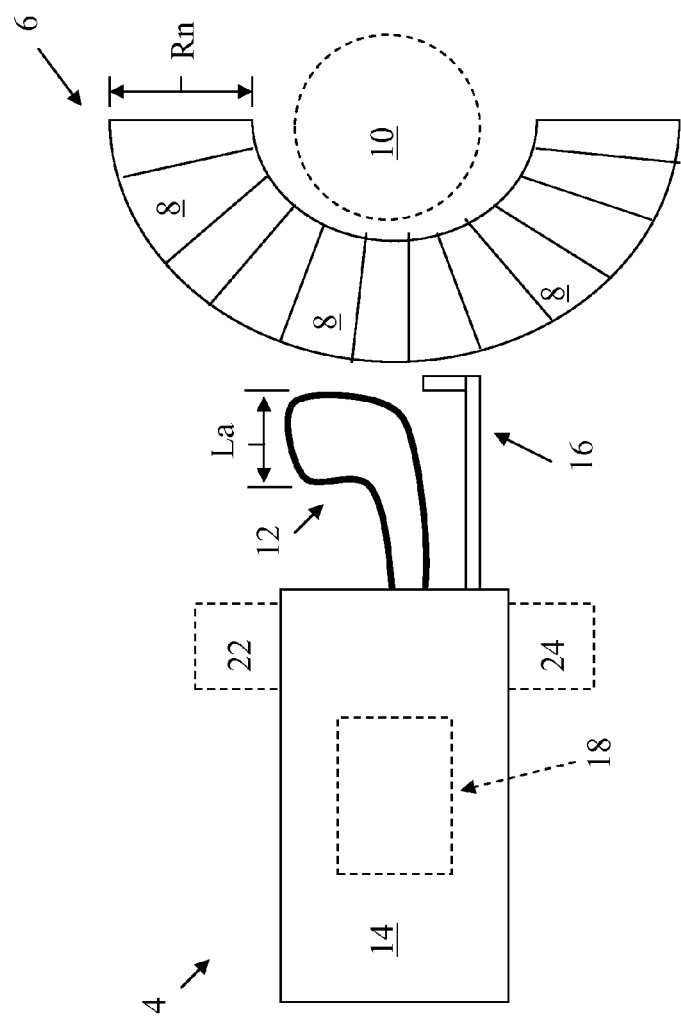
FIG. 1 shows a schematic plan view of an environment including an induction temper system according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to a temper system for a turbine. Specifically, the subject matter disclosed herein relates to a portable induction-based temper system for components of a turbine (e.g., a steam turbine).

Conventionally, some maintenance of turbine components (e.g., turbine nozzle partitions) involves transport of the components to a maintenance facility. At the maintenance facility, maintenance of static turbine diaphragm nozzle partitions can fall into two categories: minor and major. Minor repairs of static turbine nozzle partitions are conventionally performed using a metal filler applied via a welding process. These minor repairs are typically not stress-relieved after applying the filler, which allows these processes to sometimes be implemented in the field (at a customer site). Major repairs, in contrast, can require stress relief of the diaphragm (including the nozzle partition partitions) through heating in a furnace or an oven. In the case of major repairs, the turbine diaphragm must be transported to and from the maintenance facility for repair. Additionally, major repairs are conventionally performed with the turbine nozzle partitions still disassembled from their associated auxiliary hardware. This requires that the auxiliary hardware (e.g., bolts, supports, keys, sealing strips, etc.) be separated from the nozzle partitions prior to oven tempering. Transport of the turbine, and disassembly of components can be both costly and time consuming.

In contrast to these conventional approaches, aspects of the invention include a portable induction-based temper system for tempering components of a turbine (e.g., nozzle partitions), on occasion after weld repair of those components. More specifically, aspects of the invention include an induction-based temper system configured to temper nozzle partitions in a turbine (e.g., a steam turbine). This induction-based temper system is compact and portable enough to allow for maintenance of one or more turbine components (e.g., nozzle partition(s)) at remote customer-specific locations. Additionally, this induction-based temper system allows for localized heating of turbine components, which can minimize the impact of tempering on parts of a turbine adjacent or proximate to the component of interest.

More specifically, in one embodiment, an induction temper system for a turbine is disclosed, the system including: an induction member; a control system operably connected to the induction coil; and a temperature sensor operably connected with the control system, wherein the control system is configured to control an electrical current supplied to the induction member in response to a temperature indicator about a component of the turbine obtained from the temperature sensor.

Additionally, aspects of the invention provide for a method of localized induction tempering of a turbine component (e.g., a nozzle partition). In one embodiment, the method includes providing an induction coil for applying inductive heat to a turbine nozzle component for the purpose of localized tempering that component. In particular, the method may include providing an induction coil along a radial length of a static diaphragm partition (or, airfoil), and applying inductive heat across the radial length of the static diaphragm partition via the induction coil. This "localized" process can include inductively heating the nozzle partition (raising its temperature from a first, lower temperature to a second, higher temperature), while keeping the nozzle's sidewalls and/or adjacent partitions at a substantially constant first, lower temperature.

As used herein, and as is known in the art, the terms "temper" and the process of "tempering" involve applying heat to a metal (e.g., steel, iron, etc.) to reduce stress in the metal and increase its toughness and elasticity. As is known in the art, induction heating involves using electromagnetic induction generated by eddy currents surrounding a current carrier to heat a nearby conductive object (e.g., a metal such as steel, iron, etc.). The current carrier (e.g., a wire or electromagnet) carries an alternating current (AC), thereby generating eddy currents around the carrier and within nearby conductors. These nearby conductors have an inherent resistance, and when the eddy currents are passed through these metals, their resistance causes resistive (or, ohmic) heating of that nearby conductor. This heating may be used to temper the nearby conductor (e.g., element of steel, iron, etc.) for the purposes of improving one or more material properties of the conductor, such as making the conductor less brittle.

Conventional approaches of tempering turbine nozzle partitions do not use the induction-based systems and methods disclosed herein. As the systems disclosed herein are induction-based, it is understood that the localized exposure temperatures of the underlying material (e.g., turbine nozzle partitions) will be higher than in the furnace or oven-based conventional systems. However, in contrast to those over-based conventional systems, aspects of the invention allow for the application of localized heating that does not require removal (or disassembly) of hardware components proximate the nozzle partition. This localized heating may only slightly alter the temperature (e.g., by several degrees Celsius) of adjacent components such as sidewalls or adjacent partitions. Additionally, it is understood that application of induction tempering may be implemented for approximately only 5-15 minute periods per section of material (e.g., nozzle partition). This may be in contrast to the extended tempering periods implemented in conventional systems, which can last as long as 24-36 hours for a whole diaphragm (including ramping up from ambient temperature, hold time at the desired temperature for tempering, and ramp down back to ambient temperature).

Turning to FIG. 1, a schematic plan view of an environment 2 including an induction temper system 4 for tempering a component in a turbine (e.g., one or more turbine nozzle partitions 8) is depicted. Also included in the environment 2 is a turbine diaphragm 6 (e.g., a steam turbine diaphragm, partially shown). As is known in the art, the diaphragm 6 can include the plurality of nozzle partitions (or, airfoils) 8. The nozzle partitions 8 shown are fixed (or, static) nozzle partitions for directing the flow of a working fluid (e.g., steam) across the dynamic turbine blades (not shown) of a conventional turbine rotor (or, rotor) 10. The rotor 10 is shown in phantom in environment 2, as the rotor 10 may not necessarily accompany the diaphragm 6 in the induction tempering processes described in accordance with aspects of the invention.

During operation of a conventional steam turbine system including the diaphragm 6 and rotor 10, the nozzle partitions 8 can be exposed to steam at extremely high temperatures for extended periods, as well as boiler particle carry-over and solid particle erosion. These temperatures and particle exposure may wear the nozzle partitions 8, causing those nozzle partitions 8 to erode. In particular, one or more nozzle partitions 8 can erode proximate its trailing edge, or "finned" portion, diminishing that nozzle partition's 8 ability to direct fluid flow in the turbine. These nozzle partitions 8 may require periodic repair as a result. As described herein, conventional repair systems lack both the portability and induction-based functions of the induction temper system 4 disclosed and described according to embodiments of the invention. Turning more specifically to the induction temper system 4 of FIG. 1, the system 4 includes an induction member 12 and a control system 14 operably connected to the induction member 12 (e.g., via hardwired and/or wireless connections). In some embodiments, the induction member 12 may take the form of an induction coil (e.g., a copper tubing or wire) or an electromagnet at least partially contained in an insulative sleeve. The insulative sleeve can allow for the inductive heating of a proximate metal turbine part (e.g., a nozzle partition 8 and/or adjacent weld joint) while preventing electrical arcing between the induction member 12 and that proximate metal part. In other embodiments, the induction member 12 may include a metal rod, a "U-shaped" or "J-shaped" member, or any other member (e.g., a copper member) capable of performing the processes described herein. The induction member 12 may have an adjustable application length ($L_a$), such that it can be applied across nozzle partitions 8 and/or weld joints of differing lengths. That is, the induction member 12 may be pliable such that its application length ($L_a$) can be modified to coincide with a length of the part of interest (e.g., a radius $R_n$ of a nozzle partition 8).

Also shown included in the induction temper system 4 is a temperature sensor 16 operably connected with the control system 14. The temperature sensor 16 may be configured to monitor a temperature of the induction member 12, one or more nozzle partition(s) 8 and/or one or more weld joints or weld accumulations/build-ups proximate to the nozzle partition(s) 8. The temperature sensor 16, in some embodiments, may be an infra-red temperature sensor. In some embodiments, the induction temper system 4 may further include a base member 18 (shown optionally in phantom underlying the control system 14) substantially supporting the control system 14, the induction member 12 and/or the temperature sensor 16. The base member 18 can take any form capable of physically supporting the weight of the control system 14, the induction member 12 and/or the temperatures sensor 16. The base member 18 can include a slideable base member, including one or more wheels for rolling around a surface. In some cases, the base member 18 can include a retractable support structure having one or more retractable member(s) (e.g., a tripod, or 4-legged support structure). In some cases, the base member 18 can include a retractable support structure allowing for adjustment of the effective height of the induction temper system 4. The base member 18 can include a hydraulically activated, retractable, slideable, and/or rotatable mechanism for moving the induction temper system 4 within the environment 2 or between distinct environments (others not shown). The base member 18 may further allow for height adjustment within one or more environments 2 to allow for the induction temper system 4 to perform the induction tempering functions described herein on parts at differing relative heights.

The control system 14 can be configured to control an electrical current supplied to the induction member 12, based upon a temperature indicator from the temperature sensor 16. That is, the control system 14 can be configured to monitor the temperature (e.g., via temperature sensor 16) of one or more parts (e.g., a nozzle partition 8 and/or adjacent weld joint) and modify an amount of electrical current supplied to the induction member 12 based upon the determined temperature. It is understood that the control system 14 may continuously monitor the temperature of one or more parts (via temperature sensor 16), or may do so in predetermined periods or intervals. The control system 14 may be configured to control start-up and cool-down operation of the induction member 12 according to a predetermined temper cycle. For example, during start-up (or, "ramp-up") operation, the control system 14 can provide a continuously increasing electrical current to the induction member 12 until the induction member 12 and/or the member of interest (e.g., the nozzle partition 8 and/or adjacent welds) reach a predetermined desired temperature (as measured by temperature sensor 16). The control system 14 may then maintain the electrical current supply to the induction member 12 according to the temper cycle of approximately 5-15 minutes (per nozzle partition 8) to substantially maintain the temperature of the induction member 12 and/or the member of interest. The control system 14 may include conventional hardware and/or software components capable of being programmed to follow the prescribed temper cycle.

Also shown as an optional component in the induction temper system 4 is a power supply system 22 operably connected to the induction member 12 (e.g., via the control system 14 and/or conventional wiring, conduits, etc.). The power supply system 22 may be configured to provide electrical current to the induction member 12, and may include a conventional alternating-current (AC) or direct-current (DC) power supply. The power supply system 22 may be configured to connect to a conventional power outlet and/or one ore more conventional battery power systems. In some cases, where the power supply system is a DC power supply, a conventional DC/AC converter may be employed to provide the inductive member 12 with its operational capabilities as described herein.

Additionally, the induction temper system 4 may include a cooling system 24, which can be configured to cool one or more elements in the induction temper system 4, thereby regulating the temperature of such elements. For example, the cooling system 24 can be configured to circulate a cooling fluid (e.g., water or air) for transferring heat from the power supply 22 and/or induction member 12, both of which may generate heat through operation of the induction temper system 4. Additionally, the cooling system 24 can circulate fluid throughout the control system 14 to cool components thereof. It is further understood that the cooling system 24 may employ fans, conduits and/or other conventional cooling mechanisms for regulating the temperature of components within the induction temper system 4.

Figure 2:
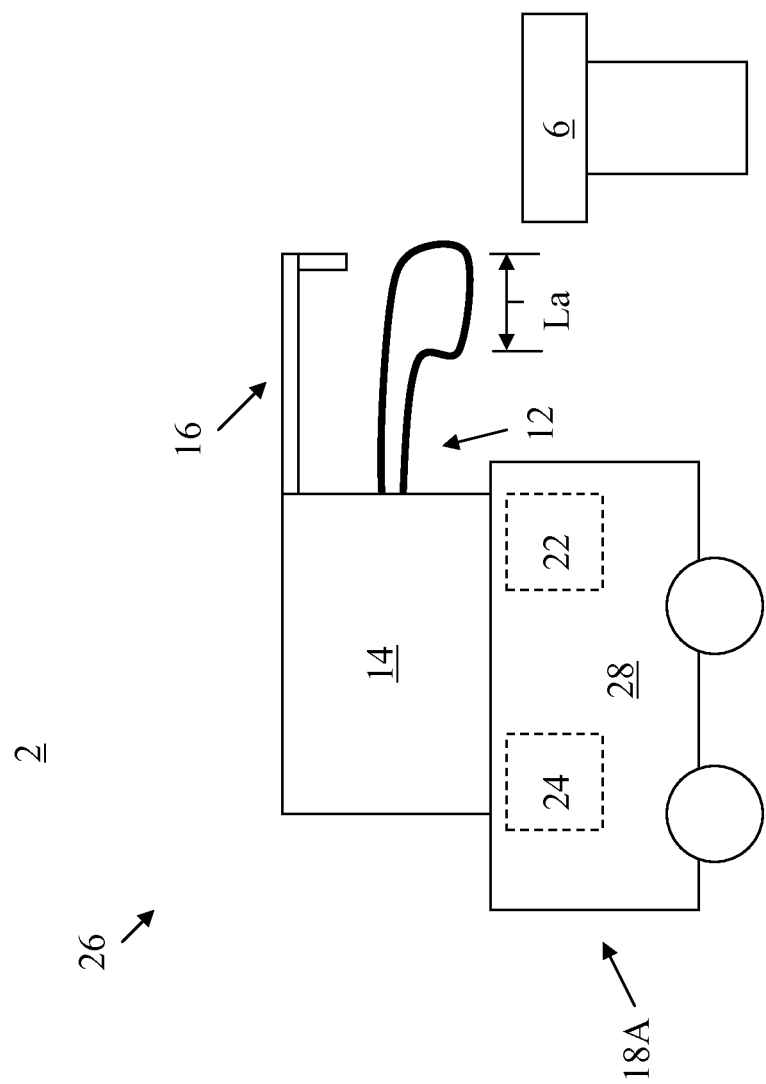
FIG. 2 shows a schematic side view of an environment including an induction temper system according to embodiments of the invention.
Figure 3:
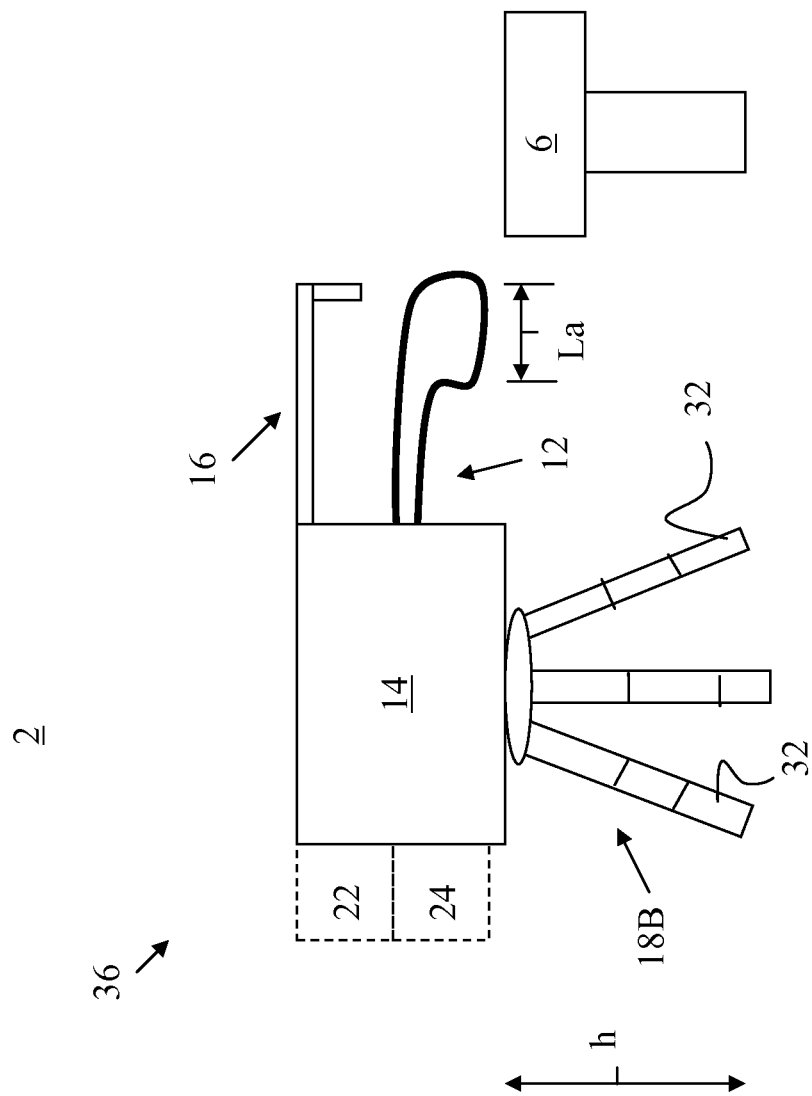
FIG. 3 shows a schematic side view of an environment including an induction temper system according to embodiments of the invention.

Turning to FIGS. 2-3, schematic depictions of systems 26 and 36, respectively, are shown including alternative embodiments of base members (18A and 18B), respectively. That is, similarly labeled elements between FIGS. 1-3 may represent substantially similar components. As shown, systems 26 and 36 may include substantially similar control systems 14, induction members 12 and temperature sensors 16, and may differ in the type of base member (e.g., 18A, 18B) shown supporting these similarly labeled components. FIG. 2 illustrates a slideable, or rolling base member 18A, having a housing 28 (e.g., a cart) at least partially supporting the power supply 22 and/or the cooling system 24 (both shown in phantom as optionally supported by housing 28). FIG. 3 illustrates a base member 18B having a plurality of retractable legs 32, which may fold up to form a substantially unitary bundle, and which may each individually retract to vary the effective height (h) of the system 36. The effective height (h) may be measured as the distance from the induction member 12 to a surface (e.g., a floor of a work space). It is understood that the effective height (h) can be modified both by the position of the base member 18B (e.g., via modification of the position of retractable legs 32) and by the position of the induction member 12, which in some embodiments, may be bent or otherwise manipulated to modify its overall length as well as its application length ($L_a$). In either case (system 26 or system 36), the transportable nature of the base members 18A, 18B allows for positioning of the induction member 12 such that it can provide localized heating to one or more portions of the diaphragm 6 (e.g., one or more nozzle partitions 8). Combined with the adjustable application length (La) of the induction member 12, the transportable nature of the base members 18A, 18B allows for more effective and localized heating of partitions than conventional systems.

Figure 4:
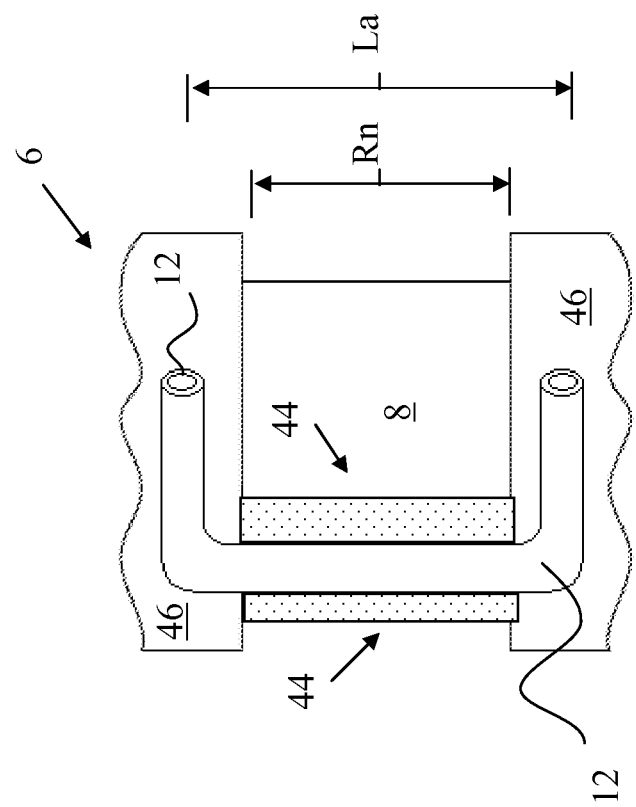
FIG. 4 illustrates a schematic cut-away top view of a portion of a diaphragm and an induction temper system according to embodiments of the invention.

FIG. 4 illustrates a schematic cut-away top view of a portion of the diaphragm 6 of FIGS. 1-3, including a nozzle partition 8, according to embodiments of the invention. This view further illustrates a cut-away section of an induction member 12 overlying a section of the diaphragm 6 according to embodiments of the invention. As shown, the induction member 12 may be configured to inductively heat the nozzle partition 8 and a weld repair section 44. In some cases, the weld repair section 44 can be located proximate the trailing or "finned" portion of the nozzle partition. The weld repair section 44 may include a weld build-up or accumulation on the surface of the nozzle partition 8, or may include a welded joint between sections of adjacent nozzles 8 (only one nozzle shown). As illustrated in FIG. 4, in some embodiments, the induction member 12 may be configured (e.g., molded, manipulated, placed, held, etc.) to have an application length ($L_a$) at least as wide as a radial height ($R_n$) of the nozzle partition 8, and in some cases, may overlap adjacent sidewalls 46.

In any case, as described herein, aspects of the invention provide for a portable system configured to treat nozzle partitions of a steam turbine diaphragm via induction tempering. This system may be configured to adjust the application length of its induction member to fit differently sized portions of interest (e.g., differently sized nozzle partitions and/or weld build-ups and joints). This induction-based temper system is lighter and significantly more portable than conventional temper systems, while still allowing for reductions in stress and increases in toughness and elasticity of the material of interest.

It is understood that in alternative embodiments, the induction tempering system disclosed herein can be used in tempering components in a conventional turbine nozzle box (as opposed to a diaphragm as shown and described herein). In this case, the induction tempering system can apply localized inductive heating to components within the nozzle box, including the inlet nozzles, while minimizing heating of surrounding components such as bridge rings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An induction temper system for a turbine, the system comprising:
    a pliable induction member having an adjustable length that is modifiable from an original length to an application length that coincides with a length of a component of the turbine that is to undergo induction tempering, the application length of the pliable induction member being further modifiable to coincide with other components of the turbine with differing lengths;
    a control system operably connected to the pliable induction member; and
    a temperature sensor operably connected with the control system,
    wherein the control system is configured to control an electrical current supplied to the pliable induction member in response to a temperature indicator about the component of the turbine obtained from the temperature sensor.

2. The induction temper system of claim 1, further comprising a base member for supporting at least one of the pliable induction member, the control system or the temperature sensor.

3. The induction temper system of claim 1, further comprising a base member for supporting at least one of the pliable induction member, the control system or the temperature sensor, the base member including at least one wheel for movement along a surface.

4. The induction temper system of claim 1, further comprising a base member for supporting at least one of the pliable induction member, the control system or the temperature sensor, the base member including a retractable support member for interacting with a surface.

5. The induction temper system of claim 1, wherein the control system is configured to control the electrical current supplied to the pliable induction member according to a prescribed temper cycle.

6. The induction temper system of claim 1, wherein the temperature sensor is an infrared temperature sensor.

7. The induction temper system of claim 1, wherein the pliable induction member includes an induction coil.

8. The induction temper system of claim 7, wherein the induction coil includes an insulative sleeve and a conductive member substantially contained within the insulative sleeve.

9. The induction temper system of claim 1, further comprising a power supply system operably connected to the pliable induction member, the power supply system for providing electrical current to the pliable induction member.

10. The induction temper system of claim 9, further comprising a cooling system for cooling at least one of the power supply system or the pliable inductive member.

11. The induction temper system of claim 1, wherein the component of the turbine is a nozzle partition of a steam turbine diaphragm, and wherein the pliable induction member is configured to inductively heat the nozzle partition across a radial length of the nozzle partition without disassembling the nozzle partition from the steam turbine diaphragm, any auxiliary hardware connecting the nozzle partition to the steam turbine diaphragm, and any other nozzle partitions proximate thereto.

12. The induction temper system of claim 11, wherein the application length of the pliable induction member is as wide as a radial height of the nozzle partition.

13. An induction temper system for a steam turbine, the system comprising:
    a pliable induction member having an adjustable length that is modifiable from an original length to an application length that coincides with a length of a component of the steam turbine that is to undergo induction tempering, the application length of the pliable induction member being further modifiable to coincide with other components of the steam turbine with differing lengths;
    a control system operably connected to the pliable induction member;
    a temperature sensor operably connected with the control system; and
    a base member substantially supporting at least one of the control system, the pliable induction member or the temperature sensor,
    wherein the control system is configured to control an electrical current supplied to the pliable induction member in response to a temperature indicator about the component of the steam turbine obtained from the temperature sensor.

14. The induction temper system of claim 13, wherein the control system is configured to control the electrical current supplied to the pliable induction member according to a prescribed temper cycle.

15. The induction temper system of claim 13, wherein the temperature sensor is an infrared temperature sensor.

16. The induction temper system of claim 13, wherein the pliable induction member includes an induction coil.

17. The induction temper system of claim 16, wherein the induction coil includes an insulative sleeve and a conductive member substantially contained within the insulative sleeve.

18. The induction temper system of claim 13, wherein the component of the steam turbine is a nozzle partition of a steam turbine diaphragm, and wherein the pliable induction member is configured to perform a localized heating of the nozzle partition across a radial length of the nozzle partition without disassembling the nozzle partition from the steam turbine diaphragm, any auxiliary hardware connecting the nozzle partition to the steam turbine diaphragm, and any other nozzle partitions proximate thereto.

19. The induction temper system of claim 18, wherein the application length of the pliable induction member is as wide as a radial height of the nozzle partition.

20. An induction temper system for a steam turbine nozzle partition, the system comprising:
- a pliable induction coil having an adjustable length that is modifiable from an original length to an application length that coincides with a length of a component of the steam turbine that is to undergo induction tempering, the application length of the pliable induction coil being further modifiable to coincide with other components of the steam turbine with differing lengths;
- a control system operably connected to the pliable induction coil;
- a temperature sensor operably connected with the control system; and
- a base member substantially supporting at least one of the control system, the pliable induction member or the temperature sensor,
- wherein the control system is configured to control an electrical current supplied to the induction coil in response to a temperature indicator obtained from the temperature sensor, and
- wherein the pliable induction coil is configured to perform a localized heating of the steam turbine nozzle partition across a radial length of the nozzle partition without disassembling the nozzle partition from the steam turbine diaphragm, any auxiliary hardware connecting the nozzle partition to the steam turbine diaphragm, and any other nozzle partitions proximate thereto.

* * * * *